Patented Jan. 18, 1927.

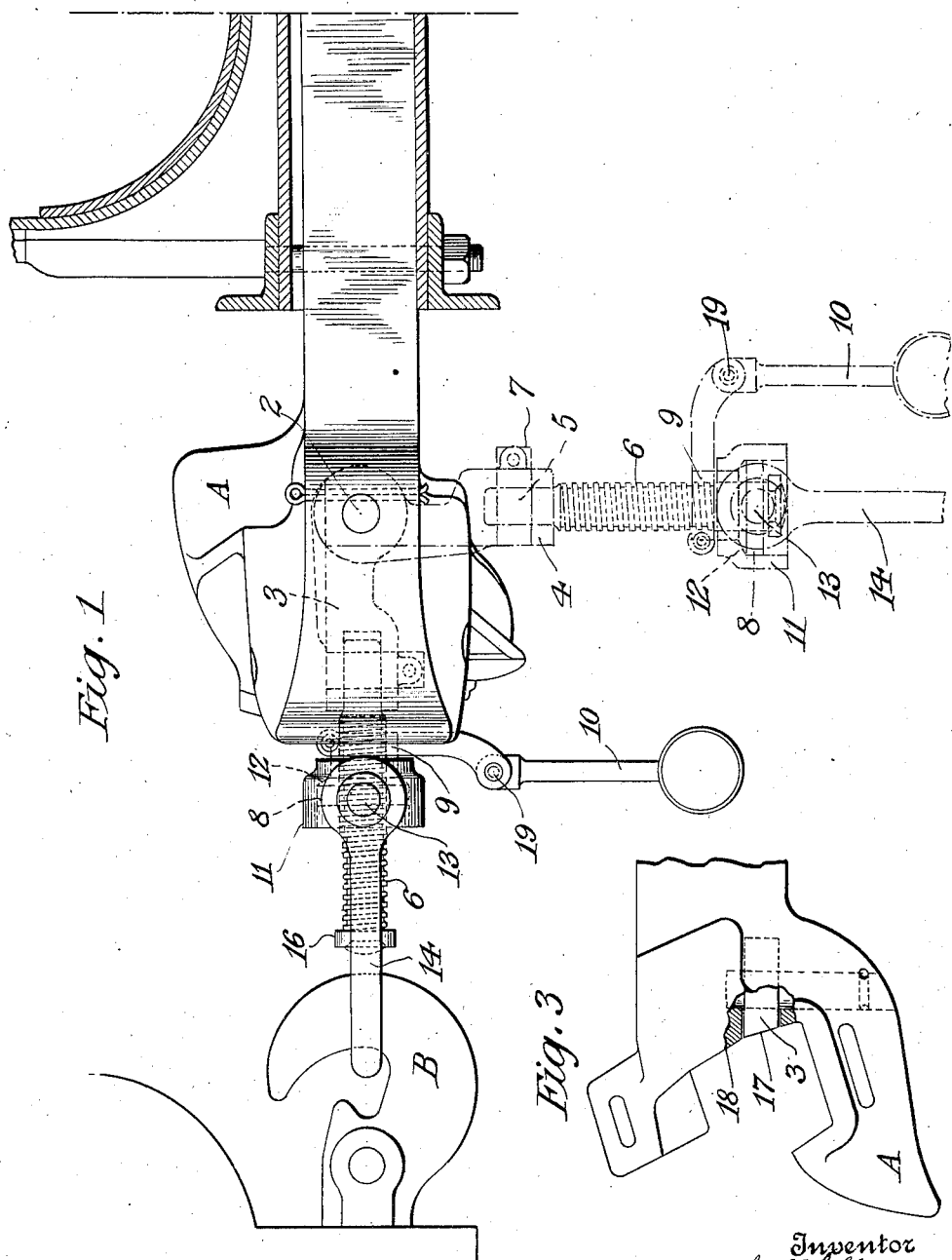

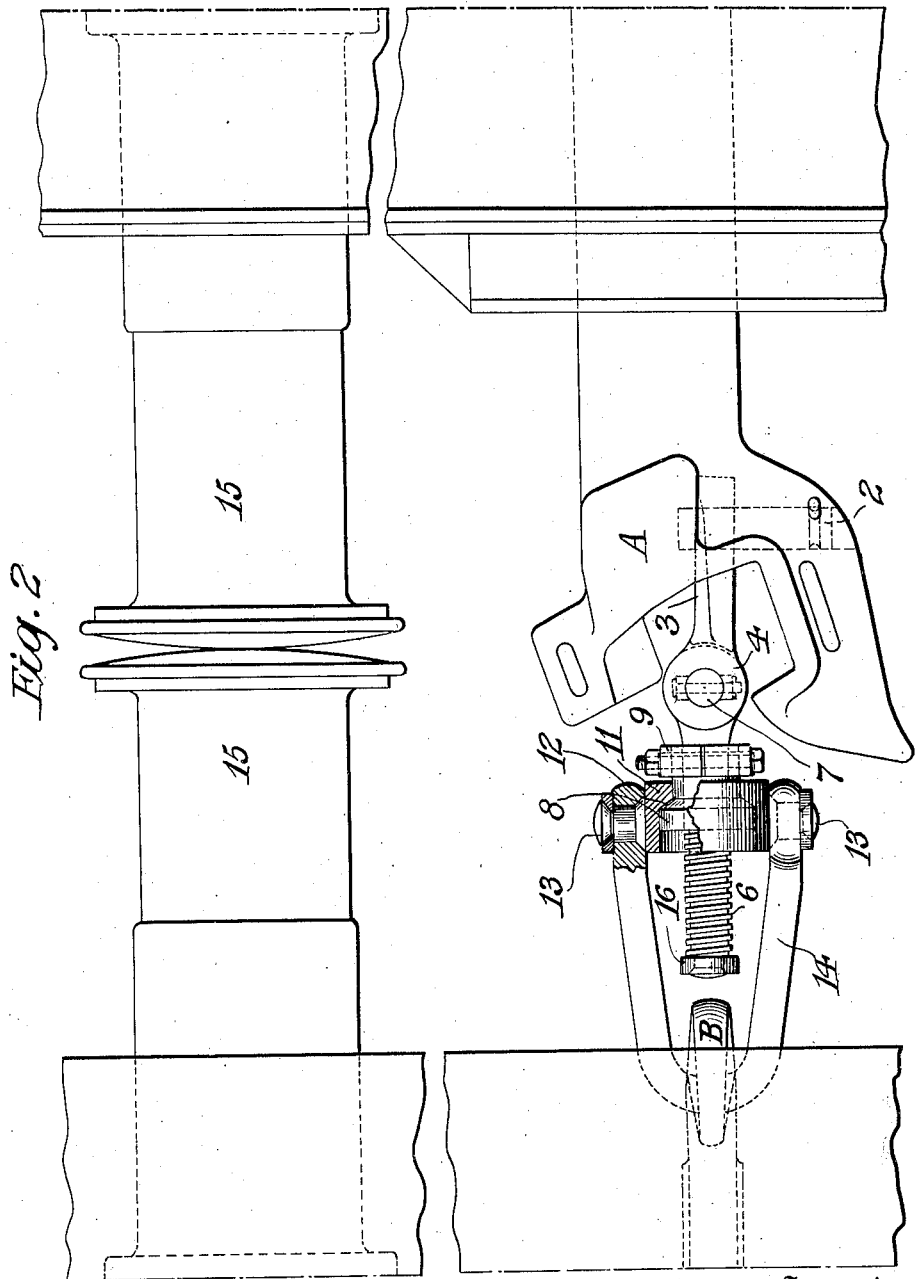

1,614,514

UNITED STATES PATENT OFFICE.

JOHN WILLISON AND DAVID ROBINSON, OF CLEVELAND, OHIO, ASSIGNORS, BY MESNE ASSIGNMENTS, TO NATIONAL MALLEABLE AND STEEL CASTINGS COMPANY, OF CLEVELAND, OHIO, A CORPORATION OF OHIO.

TRANSITION DEVICE FOR CAR COUPLERS.

Application filed September 11, 1922, Serial No. 537,293. Renewed June 1, 1926.

Fig. 1 is an elevation of our improved transition device; Fig. 2 is a plan thereof; and Fig. 3 is a detail plan of the contour face of the coupler to which the transition device is attached.

Our invention relates particularly to improvements in transitional coupling mechanism and is designed to provide means for permitting automatic car couplers to be coupled with cars equipped with couplers of other types, such as of the draw hook connection type. We provide a transitional or supplemental coupling device which can be carried by the automatic coupler and may be easily brought into and out of operative position, so that the coupler may be ready for coupling with an automatic coupler of the same type or with a draw hook arrangement or any other similar form of car coupler. Our improved device is equipped with adjusting means whereby the effective overall length of the transitional device may be varied to a large extent for ease in coupling and uncoupling and to take up the slack between the cars. Our invention also consists in the various features which we shall hereinafter describe and claim.

Referring to the drawings, A indicates a coupler of the automatic type and B a coupler of the draw hook type. Pivotally hung from a pin 2 mounted in the coupler head A is a draft member 3. The draft member 3 at its forward end terminates in jaws 4, between which the apertured end 5 of a screw member 6 is pivotally secured by means of pin 7. Threaded upon the screw member 6 is a nut 8 about whose extension 9 is rigidly clamped an operating handle 10. Taking about the nut 8 is a collar 11 having a shouldered engagement at 12 with nut 8, which provides a pulling bearing and at the same time leaves the nut free to turn within the collar 11. The collar 11 is provided with trunnion extensions 13 which extend through the eyes of a clevis or shackle 14. 15 are the buffers which maintain the cars a predetermined distance apart.

When it is desired to couple cars provided with couplers of different types, as the coupler A and coupler B, the transitional device (which when not in use depends vertically from the pin 2 in the dotted line position shown in Fig. 1) is swung up and the shackle 14 is hooked over the hook of the coupler B. Then in order to take up the slack between the cars the handle 10 is rotated to screw the nut 8 to the right along the screw member 6, as shown in Fig. 1, which carries with it collar 11 by reason of its shoulder engagement at 12, thus shortening the effective over-all length of the transition device, until the buffers 15 are in contact as shown in Fig. 2.

In order to uncouple, the handle 10 is rotated to screw the nut 8 to the left along the screw member 6, thereby increasing the length of the device between the member 3 and the shackle 14. Sufficient slack is thus secured to raise the shackle up over the point of the draw hook B, thereby uncoupling the cars. By reason of the arrangement of nut 8 and collar 11 which surrounds the nut, it is possible to increase the effective length of the device to a considerable extent, as the nut may be turned out along the screw 6 until it comes up against the face of stop 16 on the end of the screw member 6. This gives sufficient slack so that the shackle may easily be raised up over the point of the draw hook B. The whole device then swings down about the pivot 2 into inoperative position underneath the coupler, as is shown in dotted lines in Fig. 1. When in this position the then forward face 17 of the draft member 3 lies flush with, and forms a continuation of, the contour face 18 of the coupler, as is shown in Fig. 3. When the device is in inoperative position, the handle 10, by means of its pivot 19, hangs down in a vertical position.

We have found that our improved device gives ample clearance between the hook B and the end of the screw member 6 and at the same time provides sufficient travel of the nut along the screw by reason of the fact that the screw 6 and collar 11 have a telescopic engagement except when the screw is drawn as far as possible to the left.

The pivotal connection between the jaws 4 and the screw member 6 provides lateral flexibility between the coupler head A and screw member 6 which is of great advantage when the cars are being pulled around a curve.

The shoulder engagement of collar 11 and nut 8 whereby the collar is free to turn about the axis of screw member 6 is of great advantage both in coupling operations and in providing flexibility in draft.

The terms and expressions which we have employed are used as terms of description and not of limitation, and we have no intention, in the use of such terms and expressions, of excluding any mechanical equivalents of the features shown and described, or portions thereof, but recognize that various structural modifications are possible within the scope of the invention claimed.

What we claim is:

1. A transitional coupling mechanism for coupling together couplers of different types, comprising a draft member pivoted to a car coupler for movement in a vertical plane, a screw shaft secured to the draft member by a laterally flexible connection, a shackle adapted to engage a coupler of the hook type, and a screw mechanism for varying the effective over-all length of the said coupling member, said coupling being freely movable from an operative to a non-operative position to allow said car coupler without addition or subtraction of parts to couple with a like-to-like coupler.

2. A transitional coupling mechanism for coupling together couplers of different types, comprising a draft member pivoted to a car coupler, a screw shaft pivotally secured to the draft member, a collar about the screw shaft carrying a shackle, a nut in engagement with said collar, and means for rotating the nut to vary the effective over-all distance between the end of the shackle and the draft member to permit coupling and uncoupling operations with the shackle.

3. A transitional coupling mechanism for coupling together couplers of different types, a draft member pivoted to a car coupler, a screw member secured to the draft member and having a nut thereon, a collar and a shackle attached thereto, said collar having a telescopic engagement with said nut, and means for moving the said collar along the screw member to vary the effective over-all length of the device.

4. A transitional coupling mechanism for coupling together couplers of different types, a draft member, a screw member secured to the draft member and having a nut thereon, a collar carrying a shackle in engagement with said nut and being free to turn about the axis of the screw member, and means for moving the collar along the screw member to vary the effective over-all length of the device.

5. A transitional coupling mechanism for coupling together couplers of different types comprising a shackle carrying a collar, a screw member, and a nut for operatively connecting said collar to said screw member, and means for attaching said screw member to said coupler.

JOHN WILLISON.
DAVID ROBINSON.